(12) United States Patent
Tateishi et al.

(10) Patent No.: US 6,741,041 B2
(45) Date of Patent: May 25, 2004

(54) POWER CONTROLLER

(75) Inventors: Kiyoshi Tateishi, Saitama-ken (JP); Mitsuru Sato, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/445,258

(22) Filed: May 27, 2003

(65) Prior Publication Data

US 2003/0222600 A1 Dec. 4, 2003

(30) Foreign Application Priority Data

May 30, 2002 (JP) ........................................ 2002-157373

(51) Int. Cl.[7] .............................................. H05B 37/02
(52) U.S. Cl. ....................... 315/224; 315/308; 369/116; 369/13.26; 372/29.021; 372/38.02; 347/246
(58) Field of Search ................................. 315/291, 295, 315/299, 300, 302, 224, 308; 369/116, 127, 13.26, 53.26, 53.24; 347/246, 247, 253; 372/29.02, 29.021, 38.01, 38.02

(56) References Cited

U.S. PATENT DOCUMENTS 5,892,219 A * 4/1999 Minakuchi et al. ......... 250/205
6,072,761 A * 6/2000 Tani ............................ 369/116

* cited by examiner

Primary Examiner—Haissa Philogene
(74) Attorney, Agent, or Firm—McGinn & Gibb, PLLC

(57) ABSTRACT

A power controller is provided which can control the emission power from a light source to follow an appropriate response property based on a target value. The power controller includes feedforward systems for allowing currents corresponding to target values set at target value setting units to be switched at a switching device and supplied as a power setting current to an adder. Also included are feedback systems for detecting the power of the laser beam emitted by a semiconductor laser serving as the light source and adjusting a feedback current to stabilize the deviation from the target values at a predetermined value. Further included are a switching device for allowing the target values to be switched and supplied to the aforementioned feedback systems, and the adder for adding a feedback current and the power setting current to thereby generate a drive current for driving the semiconductor laser. The switching devices are simultaneously switched upon changing the power of the laser beam in response to the target values, thereby implementing an appropriate response property allowing no ringing caused in the power upon the transient event.

3 Claims, 8 Drawing Sheets

POWER CONTROLLER

BACKGROUND OF THE INVENTION

The present invention relates to a power controller for controlling the power of a light beam emitted from a light source such as a semiconductor laser.

The present application claims priority from Japanese Application No. 2002-157373, the disclosure of which is incorporated herein by reference.

Conventionally known as a power controller of this type is one for controlling a semiconductor laser in a pickup incorporated in an information read/write apparatus.

For example, known is a power controller for controlling the aforementioned semiconductor laser in order to illuminate an information storage medium such as CDs (Compact Discs), DVDs (Digital Versatile Discs), or other so-called optical discs with laser beams each of which is set to an appropriate power to write, read, and erase data thereon.

As shown in the block diagram shown in FIG. 8, this conventional power controller includes a target value setting unit 1, a subtractor 2, an integrator 3, a V-I (voltage to current) converter 4, a light receiving device 8, and an I-V (current to voltage) converter 9. The power controller controllably drives a semiconductor laser 7 which is provided in a pickup.

In this configuration, a half mirror HM provided in the pickup reflects a laser beam Po emitted from the semiconductor laser 7 for the aforementioned data writing operation or the like to illuminate the recording surface of an optical disc DISC via an optical system (not shown) and as well transmit ΔPo (part of the laser beam Po) impinging on the light receiving device 8.

Accordingly, while the laser beam Po for the writing operation or the like is being emitted, the light receiving device 8 successively detects the power of the laser beam Po to supply a detection current ΔI proportional to the detected power to the I-V converter 9, thereby causing the I-V converter 9 to successively output a detection voltage ΔV proportional to the detection current ΔI.

The target value setting unit 1 is formed of a variable voltage source. An externally entered target value for setting the power of the laser beam Po will cause the target value setting unit 1 to output a target voltage Vri proportional to the target value entered.

In this configuration, when the target value setting unit 1 outputs the target voltage Vri, the subtractor 2 determines the voltage difference (Vri−ΔV) between the target voltage Vri and the detection voltage ΔV and then the integrator 3 smoothes the voltage difference (Vri−ΔV), which is in turn converted into a DC voltage. Meanwhile, the V-I converter 4 generates a feedback current Ic proportional to the DC voltage and then supplies it as a drive current Idv to the semiconductor laser 7, thereby causing the semiconductor laser 7 to emit the laser beam Po having a power corresponding to the current value of the drive current Idv.

Accordingly, the conventional power controller allows the target voltage Vri to set the emission power of the semiconductor laser 7. Additionally, the power controller determines a variation in the power of the laser beam Po as the voltage difference (Vri−ΔV) output from the subtractor 2 to provide negative feedback control so that the power of the laser beam Po is adjusted to a constant power corresponding to the target voltage Vri.

For example, suppose that one of a target value Pr1 for writing data, a target value Pr2 for reading data, and a target value Pr3 for erasing data is externally entered as appropriate. In this case, the conventional power controller outputs the target voltage Vri proportional to the entered target value to set the laser beam Po emitted by the semiconductor laser 7 to the power for writing data, reading data, or erasing data, which is suited, e.g., for use with a phase change disc (or a rewritable optical disc). Additionally, the power controller employs the aforementioned negative feedback control, thereby preventing variations in the power of the laser beam Po.

In recent years, with the development of multifunctional and various types of information storage media, there have also been developed a write once optical disc on which data can be written only once and a rewritable optical disc on which data can be written, erased, and rewritten as many times as desired, in addition to read only optical discs.

In this background, for the information read/write apparatus employing these optical discs, there has been an increasing demand for further improved functions and multifunctional capabilities to perform writing operations, reading operations or the like at higher speeds.

As a specific example, take an information read/write apparatus which utilizes the aforementioned rewritable optical disc. In this case, there is a demand for a flexibility which enables high speed and continuous data writing processing, data reading processing, and data erasing processing, in which television broadcasting data or digital video data or the like is reproduced by streaming while recorded in real time and unnecessary data is quickly erased to provide a recording area for the subsequent data writing operation. Additionally, it is critical to develop a power controller which can provide optimal control to the emission power of the semiconductor laser in order to enable high-quality writing and reading operations without any degradation in data even when these processing procedures are carried out.

However, for example, suppose that the aforementioned target value is changed at a high speed from Pr1 to Pr2 for a high speed transition from the data writing processing to the data reading processing in the conventional power controller. In this case, there was a problem that the power of the laser beam Po emitted by the semiconductor laser 7 could not quickly reach the power corresponding to the target value Pr2 during the transition from the target value Pr1 to the Pr2.

In other words, suppose that the power levels for the data writing, reading, and erasing operations are different from each other, and the target voltage Vri output by the target value setting unit 1 is switched to different values in response to the target value Pr1, Pr2, or Pr3. In this case, the transient event caused phenomena such as overshoot or undershoot to occur in the laser beam Po emitted by the semiconductor laser 7, thereby exerting an adverse effect on the high-quality writing or reading operation. This raised a problem of making it difficult to satisfy the demand for further improved functions and multifunctional capabilities to perform the aforementioned writing or reading operation at higher speeds.

SUMMARY OF THE INVENTION

The present invention was developed in view of those problems. It is therefore an object of the present invention to provide a power controller which controllably drives a light source such as a semiconductor laser to implement, e.g., high-quality writing and reading operations.

The power controller according to a first aspect of the present invention is a power controller for controlling the power of light emitted from a light source. The power controller includes: target value setting unit for setting a plurality of target values; a plurality of feedforward unit, provided corresponding to each of the plurality of target values, for generating feed forward currents corresponding to each of the target values; first switching unit for allowing the respective feedforward currents generated by the plurality of feedforward unit to be exclusively switched and then supplied to the light source; second switching unit for allowing the plurality of target values to be exclusively switched for output; and feedback unit for supplying a feedback current to the light source, the feedback current having been adjusted such that a difference between the power of light emitted from the light source and a target value output by the second switching unit is stabilized at a predetermined value. Upon changing each of the target values, the first and second switching unit are switched simultaneously corresponding to a target value changed.

With this configuration, the power controller allows the feedforward currents to be generated corresponding to a target value and supplied to the light source via the first switching unit, thereby causing the light source to emit light at the power corresponding to the target value. The feedback unit adjusts the feedback current such that the difference between the power of light emitted from the light source and the target value output via the second switching unit is stabilized at a predetermined value, and then supplies the feedback current adjusted to the light source. Thus, the adjustment to the feedback current prevents variations or the like in the power of light emitted in accordance with the feedforward current.

Upon changing the target values, the first and second switching unit are switched simultaneously corresponding to a target value which has been changed. This prevents variations or the like in the power of light, which occur when there is a change in the target value.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Now, the present invention will be described below in more detail with reference to the accompanying drawings in accordance with the preferred embodiments.

As a preferred embodiment, explained below is a power controller which is incorporated in an information read/write apparatus for at least writing and reading data on an information storage medium such as a write once optical disc and a rewritable optical disc and which controllably drives a semiconductor laser which serves as a light source provided in the pickup incorporated in the information read/write apparatus.

First Embodiment

Figure 1:
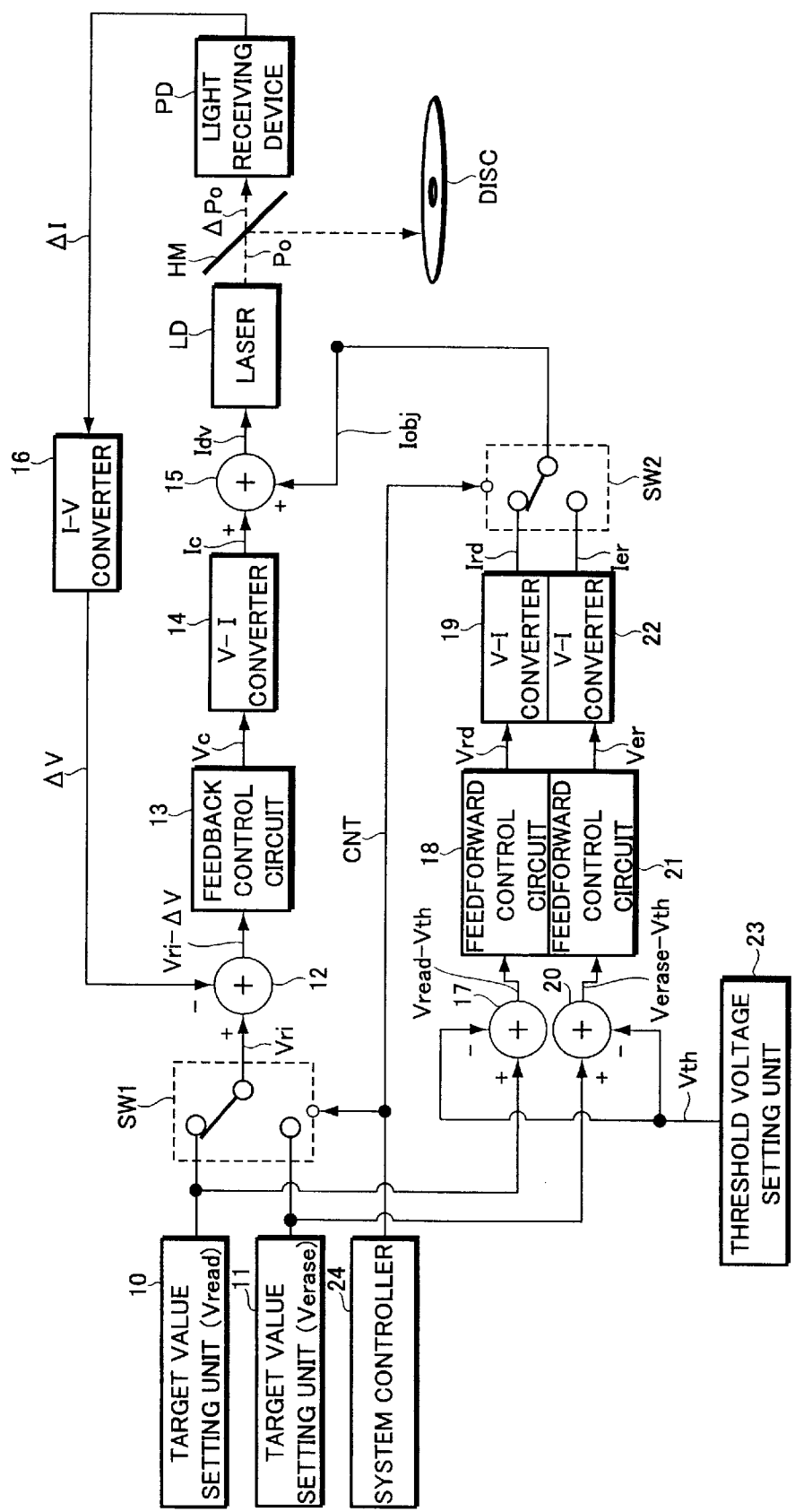
FIG. 1 is a block diagram showing the configuration of a power controller according to a first embodiment of the present invention.

FIG. 1 is a block diagram showing the configuration of a power controller according to a first embodiment of the present invention.

Referring to FIG. 1, the information read/write apparatus includes a pickup having a semiconductor laser LD serving as a light source, a half mirror HM serving as a beam splitter having a predetermined reflectivity and transmittance, and a predetermined optical system (not shown) responsible for writing and reading operations or the like.

When a laser beam Po is emitted from the semiconductor laser LD, the half mirror HM reflects and transmits the laser beam Po, thereby allowing the reflected laser beam to illuminate an optical disc DISC via the aforementioned optical system while allowing part of the transmitted laser beam or ΔPo (hereinafter referred to as the transmitted laser beam) to be received by a light receiving device PD.

Accordingly, when the laser beam Po having been set at the power for writing data is emitted from the semiconductor laser LD, data is written on the optical disc DISC. On the other hand, when the laser beam Po having been set at the power for reading data is emitted, data stored on the optical disc DISC is read. Additionally, when the laser beam Po having been set at the power for erasing data is emitted, data stored on the optical disc DISC is erased.

Furthermore, while any one of the aforementioned data writing, reading, and erasing processing is being performed, the light receiving device PD receives the transmitted laser beam ΔPo all the time, thereby outputting a detection current ΔI proportional to the power of the laser beam Po through photoelectric conversion.

This power controller includes a feedback system serving as feedback unit including the aforementioned light receiving device PD, and a feed forward system.

As the components common to the aforementioned feedback system and the feedforward system, there are provided a plurality of target value setting units 10, 11, which are independent of each other, and a system controller 24 having a microprocessor (MPU) for intensively controlling the entire operation of the power controller.

The target value setting unit 10 is formed of a constant voltage source or the like for outputting a predetermined voltage with stability. The target value setting unit 10 outputs a target voltage Vread which is used to set the power of the laser beam Po emitted by the semiconductor laser LD to the power suitable for reading data on the optical disc DISC.

In other words, the target voltage Vread is set at the voltage value which enables the semiconductor laser LD to emit the laser beam Po. In other words, the target voltage Vread is set at a voltage higher than a threshold voltage Vth corresponding to a threshold current Ith which is necessary for the semiconductor laser LD to emit the laser beam Po without causing the semiconductor laser LD to operate in an insensitive zone typical thereof, the voltage allowing the semiconductor laser LD to emit the laser beam Po having the power at which data stored in the storage layer of an optical disc DISC can be read without being erased.

The target value setting unit 11 is also formed of the same constant voltage source or the like as that of the target value setting unit 10. The target value setting unit 11 outputs a target voltage Verase which is used to set the power of the laser beam Po emitted by the semiconductor laser LD to the power suitable for erasing data on the optical disc DISC.

In other words, the target voltage Verase is set at a voltage higher than the threshold voltage Vth corresponding to the aforementioned threshold current Ith, the voltage allowing the semiconductor laser LD to emit the laser beam Po having the power at which data stored in the storage layer of the optical disc DISC can be erased.

In practice although only the two target value setting units 10 and 11 are shown in FIG. 1 as a typical example, there is also provided a target value setting unit, having other purposes necessary for data reading and writing operations or the like, such as a target value setting unit for setting the power suitable for the data writing operation.

Accordingly, for simplicity in description, the target value setting units 10 and 11 are shown as a typical example of target value setting units which are provided in the power controller according to this embodiment.

Now, the feedback system includes a switching device SW1, a subtractor 12, a feedback (FB) control circuit 13, a V-I (voltage to current) converter 14, an adder 15, and an I-V (current to voltage) converter 16, in addition to the aforementioned light receiving device PD.

The switching device SW1, formed of semiconductor devices or the like such as analog switches or multiplexers which enable high speed switching operations, performs switching operations in accordance with a switching control signal CNT supplied by the system controller 24. The switching operation allows the target voltages Vread and Verase to be exclusively selected and then supplied to the subtractor 12 as a target voltage indicated by a reference symbol Vri in the figure.

For convenience in description, FIG. 1 illustrates the switching device SW1 which has only the switching contacts connected to the target value setting units 10, 11, however, in practice, there are also provided switching contacts connected to the outputs of the aforementioned other target value setting units. The switching device SW1 thus exclusively selects by a switching operation the target voltage output by the other target value setting units in accordance with the switching control signal CNT output by the system controller 24, and then supplies the resulting voltage to the subtractor 12 as the target voltage Vri.

The subtractor 12 determines the voltage difference (Vri−ΔV) between the target voltage Vri supplied by the switching device SW1 and the detection voltage ΔV supplied by the I-V converter 16 and then supplies the voltage difference (Vri−ΔV) to the feedback control circuit 13.

That is, the I-V converter 16 converts the detection current ΔI output by the light receiving device PD into the detection voltage ΔV proportional thereto and the subtractor 12 determines the voltage difference (Vri−ΔV), thereby allowing the voltage difference (Vri−ΔV) having a variation in the power of the laser beam Po to be fed back to the feedback control circuit 13.

The feedback control circuit 13, which comprises a low-pass filter with a predetermined time constant and a voltage amplifier with a predetermined amplification factor, allows the low-pass filter to smooth and the voltage amplifier to amplify the voltage difference (Vri−ΔV) to produce a DC voltage Vc, which is in turn supplied to the V-I converter 14.

The V-I converter 14 then converts the DC voltage Vc into a DC current (hereinafter referred to as the feedback current) Ic proportional to the DC voltage Vc for output.

When the power of the laser beam Po has varied to be less than a target value, the aforementioned subtractor 12 increases the voltage difference (Vri−ΔV) in response to the amount of the variation, whereas when the power of the laser beam Po has varied to be larger than the target value, the subtractor 12 provides negative feedback control to allow the voltage difference (Vri−ΔV) to decrease in response to the variation. Thus, the feedback current Ic is adjusted to a current value so that it prevents the variation in the power of the laser beam Po, and the resulting current is supplied to the semiconductor laser LD via the adder 15.

The adder 15 adds the feedback current Ic and a power setting current Iobj supplied via a switching device SW2 (to be discussed later), to thereby generate a drive current Idv for driving the semiconductor laser LD.

According to a feedback system having such a configuration, a variation in power of the laser beam Po with respect to a so-called target value is successively output from the subtractor 12 as a voltage difference (Vri−ΔV).

Accordingly, when the laser beam Po emitted by the semiconductor laser LD is stable at a power corresponding to the so-called target value, the voltage difference (Vri−ΔV) also has a stable value. As a result, this allows the feedback current Ic output by the V-I converter 14 to be maintained at a stable current.

The adder 15 adds the stabilized feedback current Ic and the power setting current Iobj to yield the resulting drive current Idv, which is in turn supplied to the semiconductor laser LD, thereby allowing the semiconductor laser LD to keep emitting the laser beam Po at the power corresponding to the target value.

On the other hand, a variation occurring for some reason in the power of the laser beam Po emitted by the semiconductor laser LD would cause the voltage difference (Vri−ΔV) to vary in response thereto and the feedback current Ic output by the V-I converter 14 to vary as well. Since the subtractor 12 or the like provides negative feedback control as described above, the feedback current Ic is adjusted so as to suppress the variation in the power of the laser beam Po. Accordingly, by the adder 15 adding the adjusted feedback current Ic and the power setting current Iobj, the drive current Idv is generated, which enables the semiconductor laser LD to emit the laser beam Po having a power corresponding to the target value, and then supplied to the semiconductor laser LD.

As described above, the feedback system adjusts the feedback current Ic in fine increments in response to a variation in the power of the laser beam Po, then supplies the feedback current Ic to the semiconductor laser LD together with the power setting current Iobj, and provides negative feedback control in order to keep the semiconductor laser LD at the power corresponding to the target value.

Although detailed more clearly in the following description about the feedforward system, the power of the laser beam Po is mainly determined with the power setting current Iobj corresponding to the target value to be set by the feedforward system. Thus, the feedforward system sets the power setting current Iobj corresponding to the target value, while the feedback system adjusts the aforementioned feedback current Ic in fine increments to thereby provide the negative feedback control in order to maintain the power of the laser beam Po, which is to be set in accordance with the power setting current Iobj, at the power corresponding to the target value.

The feedforward system includes a subtractor 17 connected to the output of the target value setting unit 10, a subtractor 20 connected to the output of the target value setting unit 11, feedforward (FF) control circuits 18 and 21, V-I (voltage to current) converters 19 and 22, the switching device SW2, and a threshold voltage setting unit 23.

In this configuration, the threshold voltage setting unit 23, formed of a constant voltage source, outputs the threshold voltage Vth corresponding to the aforementioned threshold current Ith.

The subtractor 17 determines a voltage difference (Vread−Vth) between the threshold voltage Vth and the target voltage Vread output by the target value setting unit 10 and then supplies the resulting voltage difference (Vread−Vth) to the feedforward control circuit 18. That is, the subtractor 17 subtracts the threshold voltage Vth output by the threshold voltage setting unit 23 from the threshold voltage included in the target voltage Vread.

The subtractor 20 determines a voltage difference (Verase−Vth) between threshold voltage Vth and the target voltage Verase output by the target value setting unit 11 and then supplies the resulting voltage difference (Verase−Vth) to the feedforward control circuit 21. That is, the subtractor 20 also subtracts the threshold voltage Vth output by the threshold voltage setting unit 23 from the threshold voltage included in the target voltage Verase.

The feedforward control circuit 18 amplifies the voltage difference (Vread−Vth) by a predetermined amplification factor Kf1 to thereby generate a DC feedforward voltage Vrd, which is in turn supplied to the V-I converter 19.

The feedforward control circuit 21 amplifies the voltage difference (Verase−Vth) by a predetermined amplification factor Kf2 to thereby generate a DC feedforward voltage Ver, which is in turn supplied to the V-I converter 22.

The V-I converter 19 converts the feedforward voltage Vrd into a DC feedforward current Ird for output.

The V-I converter 22 converts the feedforward voltage Ver into a DC feedforward current Ier for output.

Like the aforementioned switching device SW1, the switching device SW2 is formed of semiconductor devices or the like, such as analog switches which enable high speed switching, and performs switching operations in accordance with the switching control signal CNT supplied by the system controller 24. The switching operation allows one of the feedforward currents Ird, Ier each output by the V-I converters 19 and 22 to be supplied to the adder 15 as the power setting current Iobj.

As described above, the feedforward system allows the subtractors 17 and 20 to determine the voltage differences (Vread−Vth) and (Verase−Vth) between their respective threshold voltages Vth and target voltages Vread and Verase which are output by the target value setting units 10 and 11, respectively. The feedforward system further allows the feedforward control circuits 18 and 21 and the V-I converters 19 and 22 to generate the DC feedforward currents Ird and Ier which are proportional to the voltage differences (Vread−Vth) and (Verase−Vth), respectively.

Accordingly, the feedforward current Ird is set to a current value at which the laser beam Po for reading data is emitted, while the feedforward current Ier is set to a current value at which the laser beam Po for erasing data is emitted.

The switching device SW2 then performs a switching operation in accordance with the switching control signal CNT from the system controller 24 to exclusively select the feedforward current Ird corresponding to the target voltage Vread or the feedforward current Ier corresponding to the target voltage Verase, thereby supplying the resulting current to the adder 15 as the power setting current Iobj.

At this stage, when the system controller 24 outputs the switching control signal CNT to set the laser beam Po for reading data, the switching devices SW1 and SW2 are connected simultaneously to the target value setting unit 10 and the V-I converter 19, respectively.

This allows the DC feedback current Ic proportional to the voltage difference (Vread−ΔV) between the target voltage Vri (i.e., Vread) and the detection signal ΔV, and the DC power setting current Iobj (i.e., Ird) proportional to the voltage difference (Vread−Vth) between the target voltage Vread and the threshold voltage Vth to be supplied to the adder 15, thereby causing the drive current Idv indicative of (Ic+Ird) to be supplied to the semiconductor laser LD.

Similarly, when the system controller 24 outputs the switching control signal CNT to set the laser beam Po for erasing data, the switching devices SW1 and SW2 are connected simultaneously to the target value setting unit 11 and the V-I converter 22, respectively.

This allows the adder 15 to add the DC feedback current Ic proportional to the voltage difference (Verase−ΔV) between the target voltage Vri (i.e., Verase) and the detection signal ΔV, and the DC power setting current Iobj (i.e., Ier) proportional to the voltage difference (Verase−Vth) between the target voltage Verase and the threshold voltage Vth, thereby causing the drive current Idv indicative of (Ic+Ier) to be supplied to the semiconductor laser LD.

For convenience in description, FIG. 1 illustrates the feedforward system which has a first system including the subtractor 17, the feedforward control circuit 18, and the V-I converter 19, which work with the target value setting unit 10, and a second system including the subtractor 20, the feedforward control circuit 21, and the V-I converter 22, which work with the target value setting unit 11. However, in practice, other systems configured in the same manner as the aforementioned first and second systems are also connected to the aforementioned other target value setting units, respectively.

That is, the feedforward system is configured to have a plurality of systems serving as the feedforward unit.

The switching device SW2 also includes switching contacts connected to V-I converters each of which is provided in each of the other systems. The switching device SW2 supplies feedforward currents generated in the other systems to the adder 15 as the power setting current Iobj in accordance with the switching control signal CNT from the system controller 24.

On the other hand, concerning with designs, each of the feedforward systems is formed of electronic components which are matched to each other in terms of electrical properties, while as shown in FIG. 1, the components having the same function in each of the systems are disposed close to each other in the same order of configuration, there by matching the electrical properties of the systems to each other.

Figure 2:
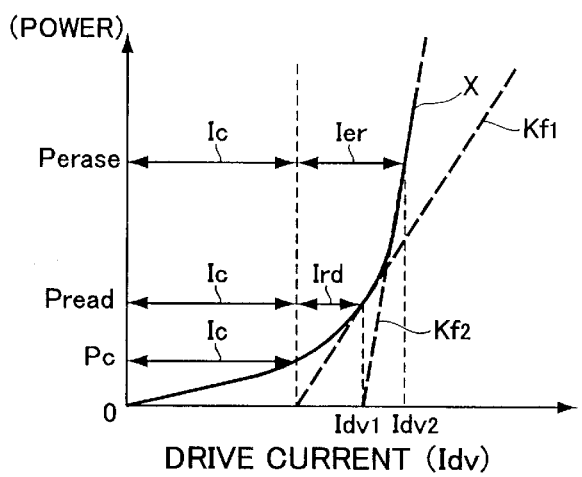
FIGS. 2A, 2B, 2C, and 2D are explanatory views showing the operations of the power controller according to the first embodiment.
Figure 2:
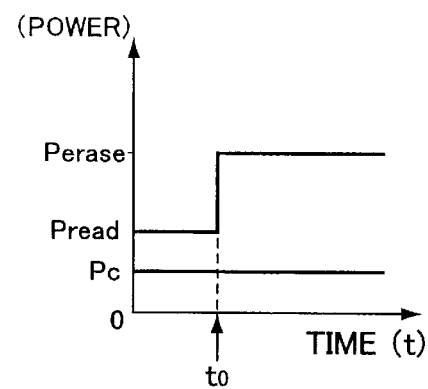
Figure 2:
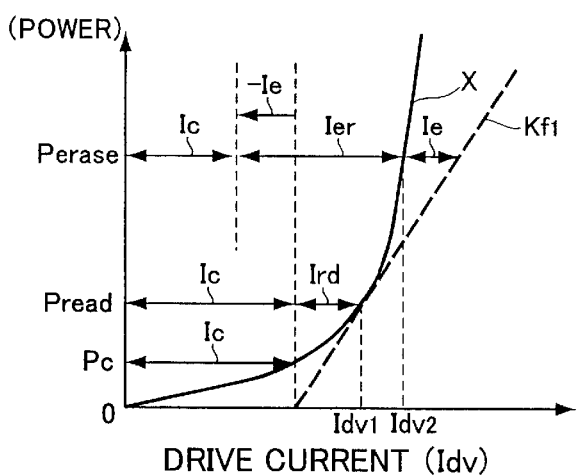
Figure 2:
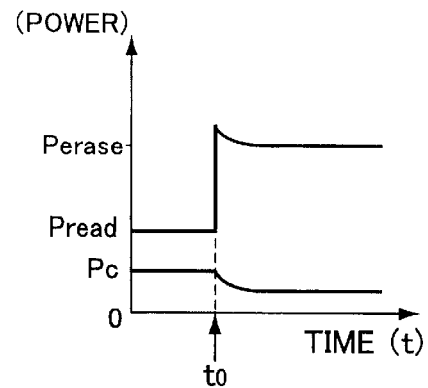
Figure 3:
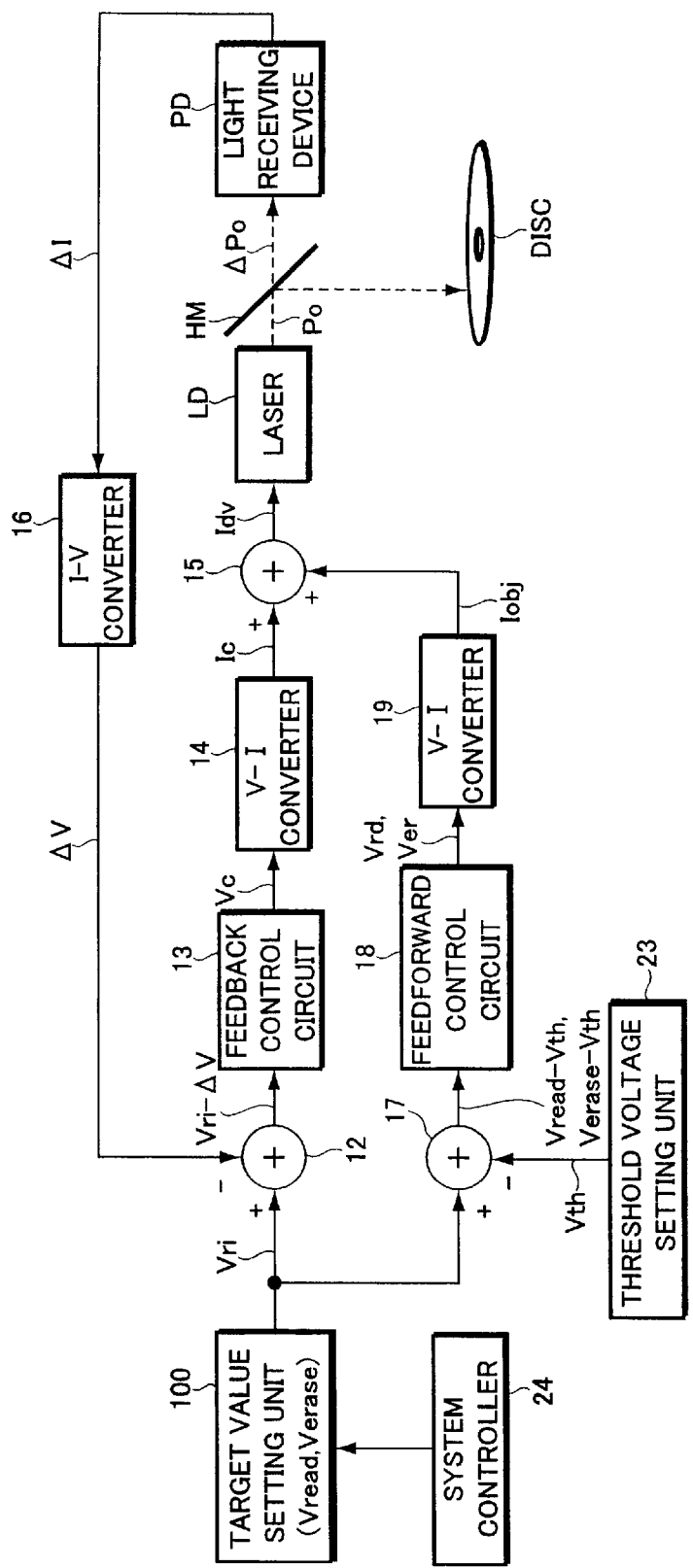
FIG. 3 is a block diagram showing the configuration of a power controller intended to demonstrate the function of the power controller according to the first embodiment.

Reference is now made to FIGS. 2 and 3 to detail the operation of the power controller configured as described above.

To facilitate understanding the operation of the power controller, description is given to a typical case where the process sets the target voltage Vri to the target voltage Vread to continue the data reading processing and then suddenly change the target voltage Vri to the target voltage Verase at a given point in time t0, thus proceeding to the data erasing processing.

FIG. 2A is a view showing the relationship between the drive current Idv and the power of the laser beam Po emitted by the semiconductor laser LD. FIG. 2B is a view showing a change in the power of the laser beam Po occurring when the target voltage Vri is switched from the target voltage Vread to the target voltage Verase at a high speed at the given point in time t0.

First, as shown in FIG. 1, the switching control signal CNT from the system controller 24 causes the switching device SW2 serving as the first switching unit to be connected to the V-I converter 19, while causing the switching device SW1 serving as the second switching unit to be connected to the target value setting unit 10, thereby making it possible to read data.

As shown in FIG. 2A, assuming that the drive current Idv employed upon reading data is represented by Idv1, the drive current Id1 is the sum (Ic+Ird) of the feedback current Ic generated by the feedback system and the feedforward current Ird generated by the feedforward system.

That is, since the power setting current Iobj supplied to the adder 15 is equal to the feedforward current Ird, the drive current Idv1 is the sum (Ic+Ird) of the feedback current Ic and the feedforward current Ird.

On the other hand, the power of the laser beam Po at that time is the power Pread corresponding to the intersection (bias point) at which the drive current Idv1, the feedforward gain Kf1 of the first system which is set by the feedforward control circuit 18, and the emission property X of the semiconductor laser LD meet together.

On the other hand, the feedback current Ic shown in FIG. 2A becomes generally equal to the threshold current Ith for the semiconductor laser LD as a result of the negative feedback control provided by the aforementioned feedback system.

Under this condition, the data reading processing is continued, and at the given point in time t0, the switching device SW1 is switched to the target value setting unit 11 and the switching device SW2 is switched to the V-I converter 22 at the same time. This causes the drive current Idv to change to a data erasing drive current Idv2 indicative of the sum (Ic+Ier) of the feedback current Ic generated by the feedback system and the feedforward current Ier generated by the feedforward system.

That is, since the power setting current Iobj supplied to the adder 15 is switched to the feedforward current Ier, the drive current Idv2 changes to the sum (Ic+Ier) of the feedback current Ic and the feedforward current Ier.

When the data erasing drive current Idv2 is supplied to the semiconductor laser LD, the power of the laser beam Po is the power Perase corresponding to the intersection (bias point) at which the drive current Idv2, the feedforward gain Kf2 of the second system which is set by the feedforward control circuit 21, and the emission property X of the semiconductor laser LD meet together.

What is worthy of special remark here is that upon the aforementioned transient event of a high speed switching of the switching devices SW1, SW2 at the point in time t0, the drive current Idv changes from the current Idv1 to the current Idv2 at a high speed indicating a good step response property, thereby allowing the power Pread to be changed to the power Perase at a high speed without causing any ringing such as an overshoot in the power of the laser beam Po as shown in FIG. 2(b).

That is, the switching device SW2 is switched at the point in time t0 causing the power setting current Iobj to change from the current Ird to the current Ier, on the transient event of which the power of the laser beam Po increases rapidly, followed by rapid increases in the detection current ΔI of the light receiving device PD and the detection voltage ΔV of the I-V converter 16. At this stage, since the switching device SW1 has already been switched at the same point in time t0 as the switching device SW2, the target voltage Vri approaches the voltage Verase upon the transient event, resulting in almost no change in the voltage difference (Vri−ΔV) output by the subtractor 12.

This allows the feedback current Ic to remain unchanged and to be kept generally equal to the aforementioned threshold current Ith.

As a result, since almost no change occurs in the feedback current Ic, the drive current Idv indicative of the sum of the feedback current Ic and the power setting current Iobj changes indicating a good step response property which follows the power setting current Iobj, also allowing the power of the laser beam Po emitted by the semiconductor laser LD to change indicating a good step response property.

As described above, according to the power controller of this embodiment, the power of the laser beam Po can be changed indicating a good step response property even upon a transient event of changing so-called target values using voltages Vread and Verase or the like. This makes it possible to switch at high speeds among the data reading, writing, and erasing operations, which are required for recording and reproduction. This in turn leads to high density recording or high speed reproduction and provides improved flexibility.

For convenience in description, such an operation has not been described by which the target voltage Verase having a high voltage is switched to the target voltage Vread having a low voltage. However, even in such a case, almost no change occurs in the feedback current Ic upon the transient event of a change from the target voltage Verase to the target voltage Vread. For this reason, the drive current Idv changes indicating a good step response property which follows the power setting current Iobj, while the laser beam Po emitted by the semiconductor laser LD also changes indicating a good step response property without causing any ringing such as undershoot.

As described above, according to the power controller of this embodiment, even when the target values are changed at high speeds in a variety of ways, the laser beam Po can be changed indicating a good step response property.

Figure 8:
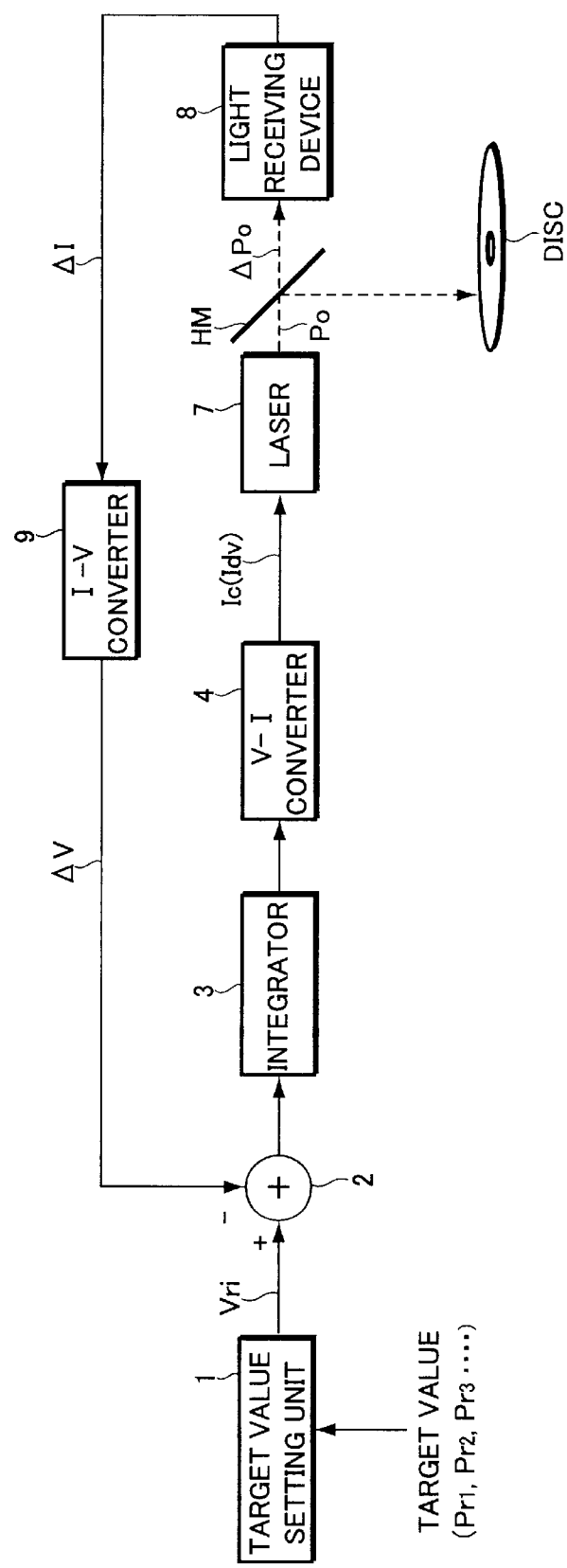
FIG. 8 is a block diagram showing the configuration of a conventional power controller.

The inventor added a feedforward system to the conventional power controller equipped with the feedback system shown in FIG. 8 to devise the power controller shown in FIG. 3, and made a comparison between the power controller shown in FIG. 3 and the power controller according to this embodiment shown in FIG. 1.

The same or equivalent components shown in the block diagram in FIG. 3 as those of FIG. 1 are indicated by the same reference symbols.

The power controller shown in FIG. 3 is provided with a single feedforward system which has the subtractor 17, the feedforward control circuit 18, the V-I converter 19, and the threshold voltage setting unit 23.

Furthermore, the power controller according to this embodiment is adapted to simultaneously switch the switching devices SW1 and SW2 to thereby change the target voltage Vri and the power setting current Iobj as shown in FIG. 1, whereas the power controller shown in FIG. 3 is provided with a target value setting unit 100 formed of variable voltage sources for outputting the target voltages Vread and Verase having different values in accordance with a command from the system controller 24.

The voltages Vread and Verase output by the target value setting unit 100 are changed at high speeds to thereby change the target voltage Vri which is to be supplied to the subtractor 12 of the feedback system, while the power setting current Iobj which is to be generated in the feedforward system is also generated in accordance with the change in the voltages Vread, Verase.

FIGS. 2C and 2D show the phenomena obtained, in the power controller shown in FIG. 3 configured as such, upon a transient event of changing the output of the target value setting unit 100 at a high speed at the given point in time t0 from the state of the target voltage Vread to the target voltage Verase.

First, a comparison showed that the power controller according to this embodiment allowed the power of the laser beam Po to change in accordance with a good step response property as shown in FIG. 2B, whereas as shown in FIG. 2D, the power controller shown in FIG. 3 caused an overshoot in the power of the laser beam Po to occur upon a transient event and the effects of the overshoot to remain thereafter, requiring a long period of time for its stabilization.

This result was conceivably obtained due to the phenomena described below.

First, as shown in FIG. 2C, the semiconductor laser LD has a non-linear emission property X for the laser beam Po against the drive current Idv. Suppose that in the semiconductor laser LD having such a non-linear emission property X, a change is made at a high speed from the target voltage Vread to Verase, the voltage difference there between being comparatively large, or from the target voltage Verase to Vread. In this case, it is difficult to properly set the amount of feedforward using the feedforward gain Kf1 of the feedforward system which is set by the feedforward control circuit 18.

That is, when a change is made from the target voltage Vread to Verase at the given point in time t0, followed by a change in the power setting current Iobj and a subsequent change made from the drive current Idv (Idv1) to Idv2, the power setting current Iobj is equal to the feedforward current Ird corresponding to the target voltage Vread in the steady state before the point in time t0 as described above with reference to FIG. 2A.

Since the feedback current Ic is stabilized in the steady state, the drive current Idv1 is then stabilized at a current indicative of the sum (Ic+Ird) of the feedback current Ic and the feedforward current Ird, while the power of the laser beam Po is at the power Pread corresponding to the intersection of the drive current Idv1, the feedforward gain Kf1, and the emission property X.

As described above with reference to FIG. 2A, the power setting current Iobj is equal to the feedforward current Ier corresponding to the target voltage Verase upon a transient event after the point in time t0, however, the drive current Idv is larger than the feedforward current Ier by a current Ie shown in FIG. 2C.

That is, the drive current Idv is larger than the feedforward current Ier by the current Ie corresponding to the difference between the non-linear emission property X and the feedforward gain Kf1.

A current source provided in the V-I converter 14 of the feedback system is responsible for the increase in the current Ie, thereby causing the feedback current Ic to vary by the current Ie.

As shown in FIG. 2D, the change in the feedback current Ic as described above causes a change of power Pc in the power of the laser beam Po, for which the feedback current Ic is responsible. This will not allow the entire power of the laser beam Po to be stabilized at the target power Perase, thereby causing ringing to occur upon an transient event and resulting in a long period of time required thereafter for the power to stabilize at the power Perase.

On the other hand, the power controller according to this embodiment will never cause the phenomena exhibited by the power controller shown in FIG. 3, allowing the laser beam Po to change indicating a good step response property as described above.

As described above, satisfactory results were not obtained in variably controlling the so-called target values using the conventional power controller shown in FIG. 8 equipped with a feedforward system simply connected to the feedback system provided therein and using the target value setting unit 100 formed of variable voltage sources in the same manner as the target value setting unit 1 provided in the conventional power controller. In contrast to this, the power controller according to this embodiment was capable of advantageously providing appropriate control to the power of the laser beam Po upon reading and writing operations, which was demonstrated and verified.

Second Embodiment

Now, a second embodiment of the present invention will be explained with reference to FIGS. 4 and 5.

Figure 4:
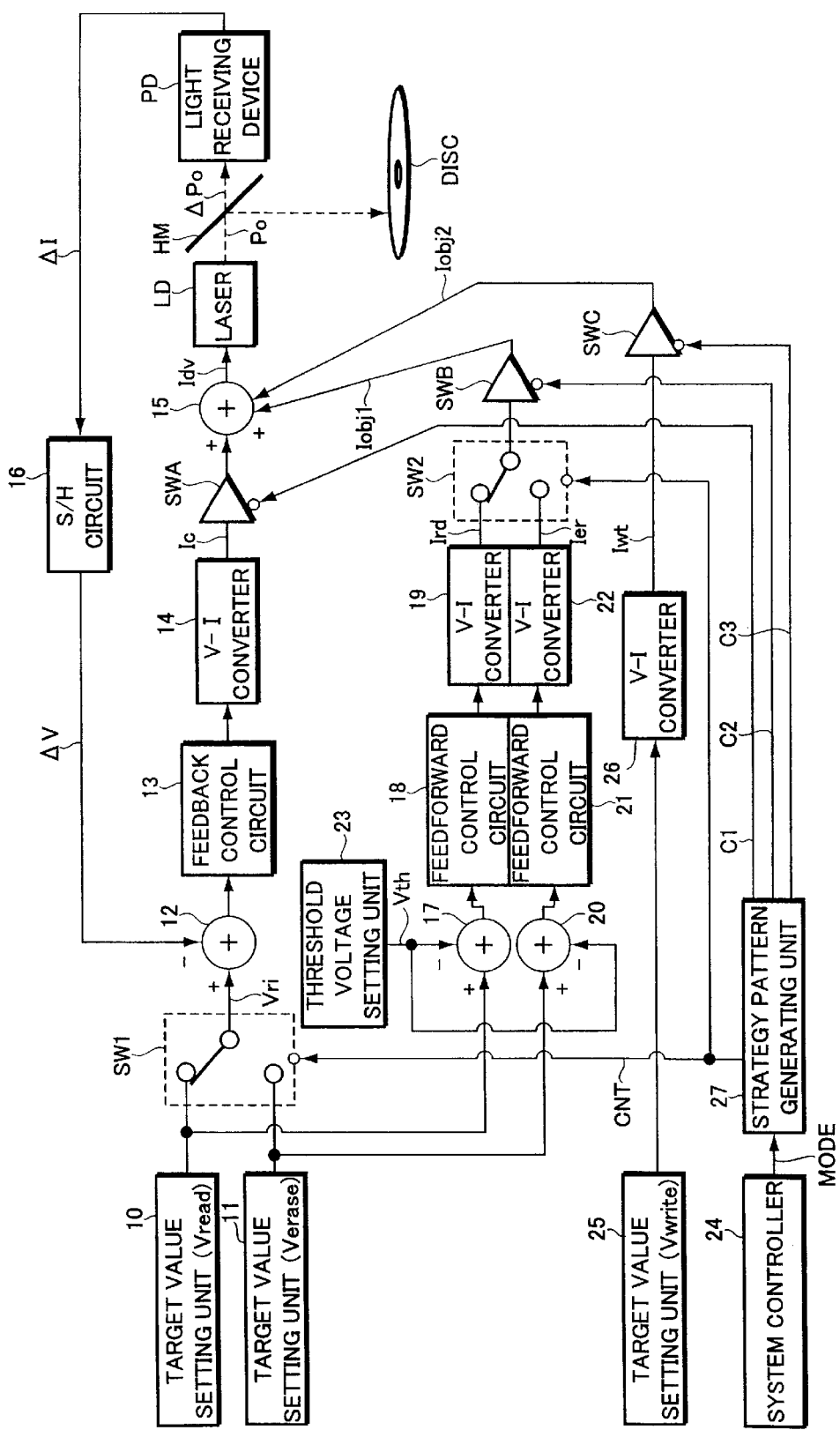
FIG. 4 is a block diagram showing the configuration of a power controller according to a second embodiment of the present invention.

FIG. 4 is a block diagram showing a power controller according to this embodiment, in which the same or equivalent components as those of the power controller shown in FIG. 1 are denoted by the same reference symbols.

First, referring to FIG. 4, the differences between the power controller according to this embodiment and the power controller shown in FIG. 1 will be described.

The power controller according to this embodiment is provided with a target value setting unit 25, a V-I (voltage to current) converter 26, and a strategy pattern generating unit 27 as well as current control switches SWA, SWB, and SWC formed of high speed analog switches.

The adder 15 is formed of a three-input one-output adder which receives the feedback current Ic supplied by the V-I converter 14 of the feedback system and the power setting currents Iobj1 and Iobj2, discussed later, and which outputs the drive current Idv.

There is provided a sample and hold (S/H) circuit 16, having a so-called current to voltage conversion function, between the light receiving device PD and the subtractor 12.

In this configuration, the target value setting unit 25, which is formed of the same constant voltage sources as those of the aforementioned target value setting units 10 and 11, outputs a target voltage Vwrite serving as a target value for setting the power of the laser beam Po at the power suitable for writing data on the optical disc DISC.

The V-I converter 26 converts the target voltage Vwrite output by the target value setting unit 25 into a DC feedforward current Iwt proportional thereto for output.

Accordingly, the target value setting unit 25 and the V-I converter 26 constitute a feedforward system for setting the feedforward current Iwt for writing data.

The current control switch SWA, which is formed of analog switches or the like which are turned ON (closed) and OFF (opened) at high speeds, is connected in between the output terminal of the V-I converter 14 in the feedback system and a predetermined input terminal of the adder 15. The current control switch SWA is turned ON or OFF in accordance with strategy pattern data C1 supplied by the strategy pattern generating unit 27, supplying the feedback current Ic from the V-I converter 14 to the adder 15 during ON while not supplying the feedback current Ic to the adder 15 during OFF.

More specifically, when the current control switch SWA is turned ON, an electrical communication is established between the output terminal of the V-I converter 14 and the predetermined input terminal of the adder 15, thereby supplying the feedback current Ic to the adder 15. On the other hand, when the current control switch SWA is turned OFF, an electrical communication is established between the output terminal of the V-I converter 14 and a ground terminal (not shown) to release the feedback current Ic to the ground terminal, thereby interrupting the feedback current Ic being supplied to the adder 15.

The current control switch SWB, which is formed of the same analog switches or the like as those of the aforementioned current control switch SWA, is connected in between the output terminal of the switching device SW2 in the feedforward system and a predetermined input terminal of the adder 15. The current control switch SWB is turned ON or OFF in accordance with strategy pattern data C2 supplied by the strategy pattern generating unit 27, supplying the feedforward current Ird or Ier from the switching device SW2 to the adder 15 during ON while not supplying both the feedforward currents Ird and Ier from the switching device SW2 to the adder 15 during OFF.

Like the current control switch SWA, the current control switch SWB also releases the feedforward currents Ird and Ier to a ground terminal during OFF.

The current control switch SWC, which is formed of the same analog switches or the like as those of the aforementioned current control switches SWA and SWB, is connected in between the output terminal of the V-I converter 26 and a predetermined input terminal of the adder 15. The current control switch SWC is turned ON or OFF in accordance with strategy pattern data C3 supplied by the strategy pattern generating unit 27, supplying the feedforward current Iwt to the adder 15 during ON while releasing the feedforward current Iwt to the ground terminal during OFF, thereby interrupting the feedforward current Iwt being supplied to the adder 15.

Figure 5:
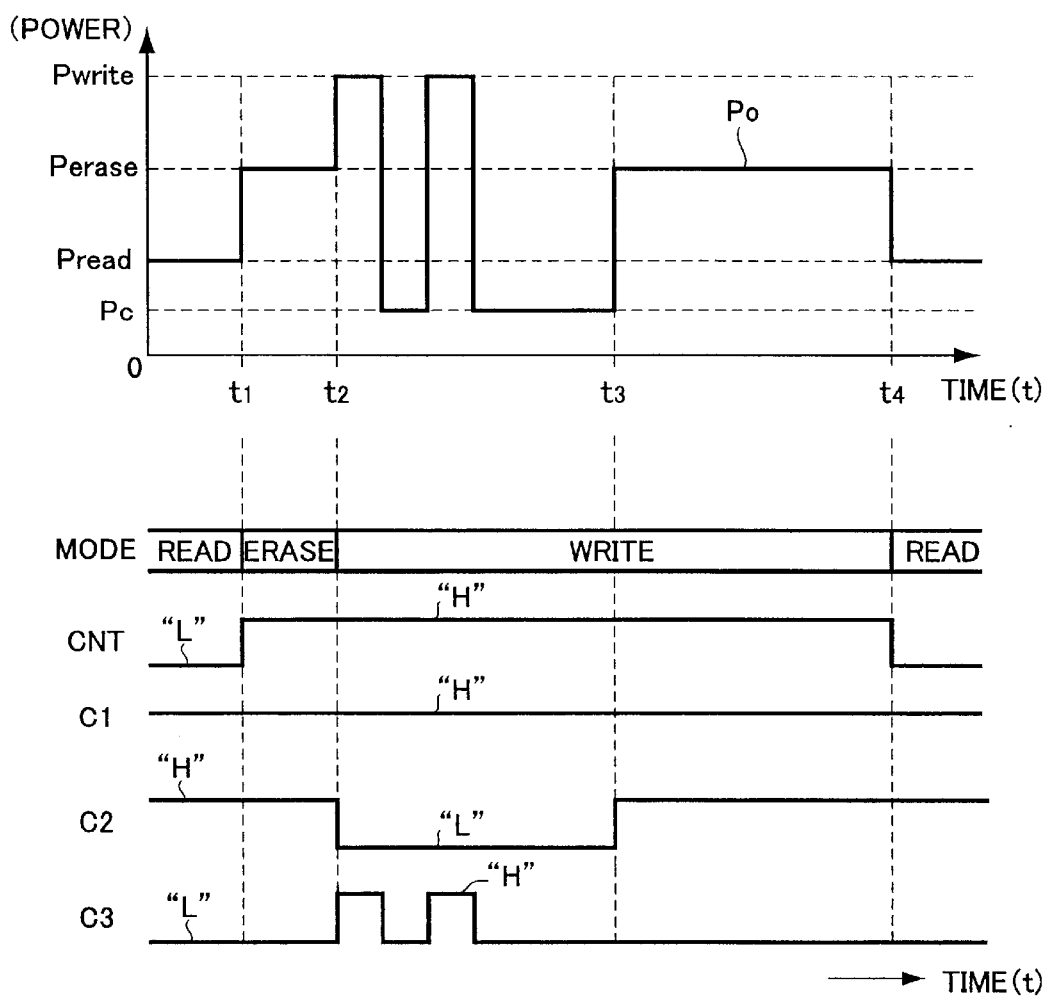
FIG. 5 is an explanatory timing chart showing the operation of the power controller according to the second embodiment.

In accordance with control data MODE from the system controller 24, the strategy pattern generating unit 27 outputs the strategy pattern data C1, C2, and C3 formed of binary logic data as shown in FIG. 5, and the switching control signal CNT for providing switching control to the switching devices SW1 and SW2.

That is, following an instruction by the control data MODE from the system controller 24 to perform any one of the data reading, erasing, and writing processing, the strategy pattern generating unit 27 outputs the strategy pattern data C1, C2, and C3, which is formed of a so-called characteristic logic waveform (binary waveform) in sync with the system clock, and the switching control signal CNT in accordance with the contents of each processing.

Now, referring to FIG. 5, the operation of the power controller according to this embodiment will be described below. As an operational example, a description is given to a case where the system controller 24 issues the control data MODE shown in FIG. 5 to perform data reading, erasing, writing, and reading processing in that order.

As shown by the periods before the point in time t1 and after the point in time t4 in which a data reading instruction is in effect, the process allows the switching control signal CNT to take on a logic "L," followed by the switching device SW1 being connected to the target value setting unit 10 and the switching device SW2 being connected to the V-I converter 19.

During the periods before the point in time t1 and after the point in time t4 in which the data reading instruction is in effect, the strategy pattern data C1, C2, and C3 takes on the logic "H," "H," and "L," respectively, followed by the current control switches SWA, SWB, and SWC being turned "ON," "ON," and "OFF," respectively.

When the switching devices SW1 and SW2 and the current control switches SWA, SWB, and SWC perform their respective predetermined operations in response to the data reading instruction issued as such, the target voltage Vri is set to the target voltage Vread. The process further allows the adder 15 to be supplied with the feedback current Ic and a power setting current Iobj1 (i.e., the feedforward current Ird) via the current control switch SWB, where as allowing the adder 15 not to be supplied with a power setting current Iobj2 (i.e., the feedforward current Iwt) from the current control switch SWC.

This causes the drive current Idv output by the adder 15 to take on a current value indicative of (Ic+Ird) and drive the semiconductor laser LD, thereby allowing the laser beam Po having the power Pread suitable for reading data to be emitted.

On the other hand, during a period as shown from the point in time t1 to t2 in which a data erasing instruction is in effect, the process allows the switching control signal CNT to take on the logic "H," followed by the switching device SW1 being connected to the target value setting unit 11 and the switching device SW2 being connected to the V-I converter 22.

Furthermore, during the period from the point in time t1 to t2, the strategy pattern data C1, C2, and C3 takes on the logic "H," "H," and "L," respectively, followed by the current control switches SWA, SWB, and SWC being turned "ON," "ON," and "OFF," respectively.

When the switching devices SW1 and SW2 and the current control switches SWA, SWB, and SWC perform their respective predetermined operations in response to the data erasing instruction issued as such, the target voltage Vri is set to the target voltage Verase.

The process further allows the adder 15 to be supplied with the feedback current Ic and the power setting current Iobj1 (i.e., the feedforward current Ier) via the current control switch SWB, whereas allowing the adder 15 not to be supplied with the power setting current Iobj2 (i.e., the feedforward current Iwt) from the current control switch SWC.

This causes the drive current Idv output by the adder 15 to take on a current value indicative of (Ic+Ier) and drive the semiconductor laser LD, thereby allowing the laser beam Po having the power Perase suitable for erasing data to be emitted.

On the other hand, during a period as shown from the point in time t2 to t4 in which a data writing instruction is in effect, the process allows the switching control signal CNT to take on the logic "H," followed by the switching device SW1 being connected to the target value setting unit 11 and the switching device SW2 being connected to the V-I converter 22.

Accordingly, during the period from the point in time t2 to t4, the target voltage Vri is set to the target voltage Verase, while the current control switch SWB has the feedforward current Ier supplied thereto.

As shown in FIG. 5, during the first half period (t2 to t3) and the second half period (t3 to t4) in the period from the point in time t2 to t4, the characteristic strategy pattern data C1, C2, and C3 varied for the respective periods is generated.

During the period from the point in time t2 to t4, the strategy pattern data C1 is maintained at the logic "H," resulting in the current control switch SWA being closed to supply the feedback current Ic to the adder 15.

On the other hand, the strategy pattern data C2 and C3 varies as shown in FIG. 5, followed by the current control switches SWB and SWC repeating their ON and OFF operations, thereby causing a change in the value of the drive current Idv output by the adder 15.

Accordingly, the change in the value of the drive current Idv in response to the strategy pattern data C1, C2, and C3 will cause a change in the power of the laser beam Po, the change in the power providing, among other things, an effect of forming recorded pits in an appropriate shape on the recording surface of the optical disc DISC.

Furthermore, according to the power controller of this embodiment, the switching control signal CNT and the strategy pattern data C1, C2, and C3 are changed at high speeds, followed by the so-called target values for setting the power of the laser beam Po being varied at high speeds. Each of the switching devices SW1 and SW2 and the current control switches SWA, SWB, and SWC perform their ON and OFF operations, thereby setting the drive current Idv corresponding to the target values.

That is, upon a transient event of switching the target values, the involvement of the ON and OFF operations of the switching device SW2 and the current control switches SWA, SWB, and SWC, serving as the first switching unit, and the second switching device SW1 allows the drive current Idv to change to the current value corresponding to the target values.

For this reason, the same effect as that provided by the power controller according to the first embodiment can be obtained. That is, upon a transient event of the target values being switched at high speeds, it is possible to prevent ringing or the like from occurring in the drive current Idv and the power of the laser beam Po and implement high speed reading and writing operations.

Third Embodiment

Now, a third embodiment according to the present invention will be described below with reference to FIGS. 6 and 7.

Figure 6:
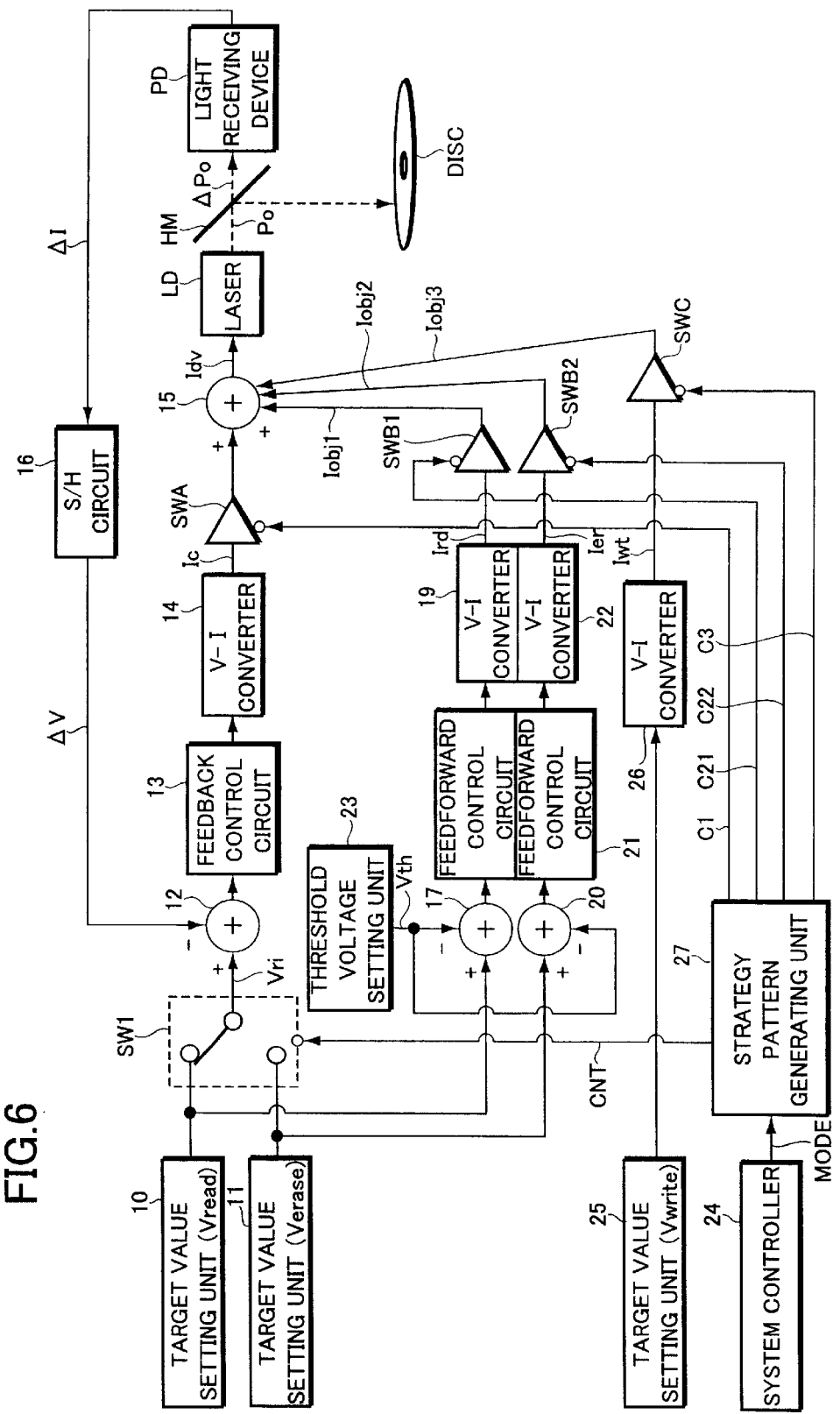
FIG. 6 is a block diagram showing the configuration of a power controller according to a third embodiment of the present invention.

FIG. 6 is a block diagram showing a power controller according to this embodiment, in which the same or equivalent components as those of the power controller shown in FIG. 1 or FIG. 4 are denoted by the same reference symbols.

First, referring to FIG. 6, the differences between the power controller according to this embodiment and the power controller shown in FIG. 4 will be described.

Referring to FIG. 6, the power controller according to this embodiment employs a four-input one-output adder as the adder 15.

Furthermore, the switching device SW2 of the feedforward system has been eliminated, in place of which employed are a current control switch SWB1 connected in between the V-I converter 19 and a predetermined input terminal of the adder 15, and a current control switch SWB2 connected in between the V-I converter 22 and another predetermined input terminal of the adder 15.

Furthermore, in contrast to the power controller shown in FIG. 4 in which the switching device SW2 is switched in accordance with the switching control signal CNT, this embodiment is adapted such that strategy pattern data C21 and C22 generated by the strategy pattern generating unit 27 provides ON and OFF control to the current control switches SWB1 and SWB2, respectively.

Accordingly, the switching device SW1 is switched in accordance with the switching control signal CNT to set the target voltage Vri. Additionally, the adder 15 is supplied with the feedback current Ic and the feedforward currents Ird, Ier, and Iwt through the ON and OFF operations of each of the current control switches SWA, SWB1, SWB2, and SWC in accordance with the strategy pattern data C1, C21, C22, and C3.

FIG. 6 also illustrates a case where the feedforward currents Ird, Ier, and Iwt supplied to the current control switches SWB1, SWB2, and SWC are supplied to the adder 15 as the power setting currents Iobj1, Iobj2, and Iobj3, respectively.

Now, the operation of the power controller configured as described above will be explained below with reference to FIG. 7. The timing chart in FIG. 7 is shown corresponding to the timing chart of FIG. 5, showing an operational example in which the system controller 24 issues the control data MODE to perform data reading, erasing, writing, and reading processings in that order.

Figure 7:
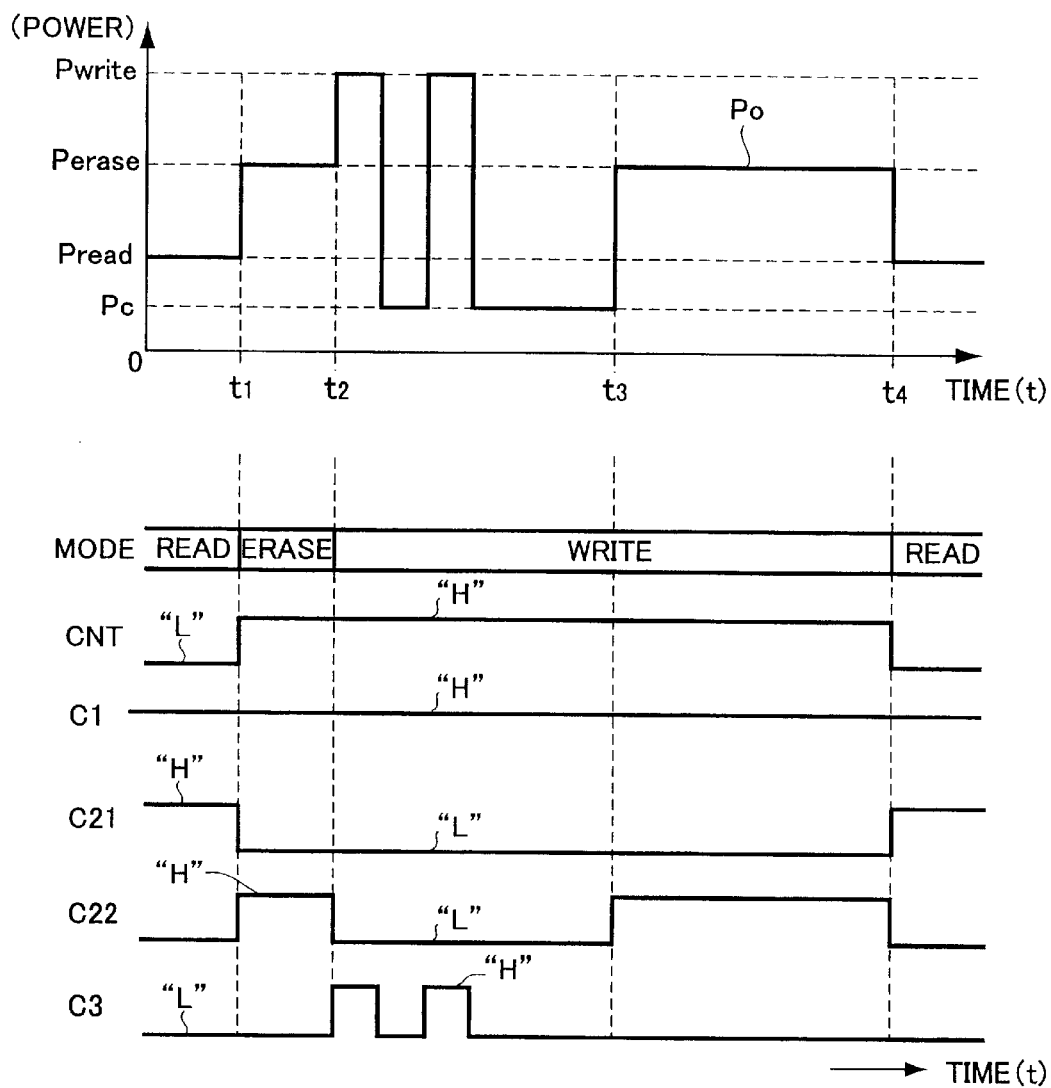
FIG. 7 is an explanatory timing chart showing the operation of the power controller according to the third embodiment.

Contrasting FIG. 7 with FIG. 5, no change has been made to the switching control signal CNT and the strategy pattern data C1 and C3.

The strategy pattern data C21 and C22 newly added instead of the strategy pattern data C2 is set at the logic "H" and "L," respectively, during the data writing period (the periods before the point in time t1 and after the point in time t4).

Furthermore, during the data erasing period (the period from the point in time t1 to t2), the strategy pattern data C21 and C22 is set at the logic "L" and "H," respectively.

Still furthermore, during the data writing period (the period from the point in time t2 to t4), the strategy pattern data C21 is set at the logic "L," while the strategy pattern data C22 is set at the logic "L" during the first half period (the period from the point in time t2 to t3) and at the logic "H" during the second half period (the period from the point in time t3 to t4).

The changes in the switching control signal CNT and the strategy pattern data C1, C21, C22, and C3 would cause the drive current Idv output by the adder 15 to change in the same way as the power controller shown in FIG. 4, followed by a change in the power of the laser beam Po emitted by the semiconductor laser LD occurring in the same way as shown in FIG. 5.

That is, the power of the laser beam Po shown in FIG. 7 changes in the same way as the power of the laser beam Po shown in FIG. 5.

Like the power controller shown in FIG. 4, the power controller according to this embodiment is adapted such that a change in the drive current Idv in response to the strategy pattern data C1, C21, C22, and C3 would cause a change in the power of the laser beam Po, the change in the power providing, among other things, an effect of forming recorded pits in an appropriate shape on the recording surface of the optical disc DISC.

Furthermore, according to the power controller of this embodiment, the switching control signal CNT and the strategy pattern data C1, C21, C22, and C3 are changed at high speeds, followed by the so-called target values for setting the power of the laser beam Po being varied at high speeds. The switching device SW1 and the current control switches SWA, SWB1, SWB2, and SWC perform their ON and OFF operations, thereby setting the drive current Idv corresponding to the target values.

That is, upon a transient event, the involvement of the ON and OFF operations of the switching device SWA, SWB1, SWB2, and SWC serving as the first switching unit and the switching device SW1 serving as the second switching unit allows the drive current Idv to change to the current value corresponding to the target values.

For this reason, the same effect as that provided by the power controller according to the first and second embodiments can be obtained. That is, upon a transient event of the target values being switched at high speeds, it is possible to prevent ringing or the like from occurring in the drive current Idv and the power of the laser beam Po and implement high speed reading and writing operations.

The foregoing first to third embodiments have been employed only as specific technical examples to describe the present invention, and the invention is not limited thereto.

For example, these embodiments employ the semiconductor laser LD as a light source to be controlled, however, the present invention can also be advantageously applied to a light source having a non-linear emission property of the power of light emitted therefrom against its drive current.

By way of example, suppose that a light-emitting device such as a light-emitting diode, which is fabricated through the semiconductor manufacturing process, is employed as the light source. In this case, the present invention can be advantageously applied to the control on the power of the light source.

The present invention has also be described in accordance with the embodiments in which a plurality of target voltages Vread, Verase, and Vwrite are generated by means of a plurality of target value setting units 10, 11, 25 and the like, however, the present invention is not limited thereto. It may also be acceptable to employ a multi-output power source device which outputs a plurality of target voltages having different voltages. What is essential is that a plurality of feedforward systems should be provided corresponding to a plurality of target values, respectively.

The present invention has also been described with reference to the embodiments in which the adder 15 adds the feedback current Ic and the power setting current Iobj or the like to thereby generate the drive current Idv. However, it is not necessarily required for the adder 15 to generate the drive current Idv. What is essential is that the feedback current Ic and the power setting current Iobj or the like should be supplied to the semiconductor laser LD. Accordingly, for example, it is possible to employ not the adder 15 but a wired OR configuration to supply the feedback current Ic and the power setting current Iobj or the like to the semiconductor laser LD.

It is also possible to supply to the feedforward system the target voltages Vread, Verase, Vwrite or the like, each having a voltage value for which the threshold voltage Vth has been taken into account in advance, thereby eliminating the subtractors 17 and 20 and the threshold voltage setting unit 23.

As described above, the power controller according to the present invention generates a feedforward current corresponding to target values at feedforward unit to supply it to a light source and adjusts the feedback current supplied to the light source to prevent variations in the power of the light. Upon changing the target values, first and second switching units are simultaneously switched corresponding to the target values changed, thereby simultaneously changing the feedback current corresponding to the target values and the target values for adjusting the feedback current. This allows the power of the light to change in accordance with an appropriate response property corresponding to the change in the target values. Accordingly, for example, it is possible to provide a power controller which enables high-quality reading and writing operations.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A power controller for controlling a power of light emitted from a light source, comprising:

target value setting unit for setting a plurality of target values;

a plurality of feedforward unit, provided corresponding to each of said plurality of target values, for generating feedforward currents corresponding to each of said target values;

first switching unit for allowing the respective feedforward currents generated by said plurality of feedforward unit to be exclusively switched and then supplied to said light source;

second switching unit for allowing said plurality of target values to be exclusively switched for output; and feedback unit for supplying a feedback current to said light source, the feedback current having been adjusted such that a difference between the power of light emitted from said light source and a target value output by said second switching unit is stabilized at a predetermined value, wherein upon changing each of said target values, said first switching unit and said second switching unit are switched simultaneously corresponding to a target value changed.

2. The power controller according to claim 1, wherein said target value setting unit outputs a plurality of voltages corresponding to each of said plurality of target values, and each of said plurality of feedforward unit performs a voltage to current conversion on each of said plurality of voltages, thereby generating a feedforward current corresponding to each of said target values.

3. The power controller according to claim 1, wherein said feedforward current and said feedback current to be supplied to said light source are supplied to said light source as a drive current obtained by adding said feedforward current and said feedback current by means of adder unit.

* * * * *